(12) United States Patent
Lair

(10) Patent No.: US 6,971,229 B2
(45) Date of Patent: Dec. 6, 2005

(54) CONFLUENT EXHAUST NOZZLE

(75) Inventor: Jean-Pierre Lair, San Antonio, TX (US)

(73) Assignee: The NORDAM Group, Inc., Tulsa, OK (US)

( * ) Notice: Subject to any disclaimer, the term of this patent is extended or adjusted under 35 U.S.C. 154(b) by 11 days.

(21) Appl. No.: 10/781,409

(22) Filed: Feb. 18, 2004

(65) Prior Publication Data

US 2005/0204742 A1   Sep. 22, 2005

Related U.S. Application Data

(60) Provisional application No. 60/450,121, filed on Feb. 26, 2003.

(51) Int. Cl.[7] .............................. B63K 11/10; F02K 3/02
(52) U.S. Cl. ..................... 60/226.1; 60/262; 60/264; 239/235.19; 181/220
(58) Field of Search ........................... 60/226.1, 226.3, 60/262, 264; 239/265.19, 265.23; 181/213, 181/220

(56) References Cited

U.S. PATENT DOCUMENTS

| | | | |
|---|---|---|---|
| 3,721,389 A * | 3/1973 | MacKinnon et al. ... | 239/265.19 |
| 3,779,010 A | 12/1973 | Chamay et al. | |
| 3,820,719 A | 6/1974 | Clark | |
| 3,938,742 A * | 2/1976 | Corson, Jr. ............ | 239/265.11 |
| 4,156,344 A * | 5/1979 | Cuthbertson et al. ...... | 60/226.1 |
| 4,291,782 A * | 9/1981 | Klees .......................... | 181/215 |
| 4,922,712 A | 5/1990 | Matta et al. | |
| 4,922,713 A | 5/1990 | Barbarin et al. | |
| 5,181,676 A | 1/1993 | Lair | |
| 5,221,048 A | 6/1993 | Lair | |
| 5,655,360 A | 8/1997 | Butler | |
| 5,694,767 A | 12/1997 | Vdoviak et al. | |
| 5,778,659 A | 7/1998 | Duesier et al. | |
| 5,779,192 A | 7/1998 | Metezeau et al. | |
| 5,819,527 A | 10/1998 | Fournier | |
| 5,826,823 A | 10/1998 | Lymons et al. | |
| 5,853,148 A | 12/1998 | Standish et al. | |
| 5,863,014 A | 1/1999 | Standish | |
| 5,875,995 A | 3/1999 | Moe et al. | |
| 5,913,476 A | 6/1999 | Gonidec et al. | |
| 5,934,613 A | 8/1999 | Standish et al. | |
| 6,070,407 A | 6/2000 | Newton | |
| 6,101,807 A | 8/2000 | Gonidec et al. | |
| 6,129,309 A * | 10/2000 | Smith et al. .............. | 244/53 B |
| 6,640,537 B2 * | 11/2003 | Tse ............................ | 60/262 |
| 2003/0126856 A1 | 7/2003 | Lair | |

* cited by examiner

*Primary Examiner*—Charles G. Freay
(74) *Attorney, Agent, or Firm*—Francis L. Conte

(57) ABSTRACT

A gas turbine engine exhaust nozzle includes a nacelle having an inlet and main outlet at opposite ends, and a main duct extending therebetween. A secondary bypass duct extends radially through the nacelle upstream of the main outlet and includes an unobstructed secondary inlet joined to the main duct, and a secondary outlet surrounding the main outlet for collectively discharging exhaust flow in confluent streams.

25 Claims, 4 Drawing Sheets

CONFLUENT EXHAUST NOZZLE

This application claims the benefit of U.S. Provisional Application No. 60/450,121; having filing date Feb. 26, 2003.

BACKGROUND OF THE INVENTION

The present invention relates generally to turbofan aircraft engines, and, more specifically, to exhaust nozzles therefor.

A typical turbofan aircraft engine includes a fan powered by a core engine. The core engine includes a surrounding cowl or nacelle, and the fan includes a corresponding cowl or nacelle at the forward end of the core engine which extends aft either in part or fully thereover.

The fan nacelle is spaced radially outwardly from the core nacelle to define an annular bypass duct therebetween. During operation, the core engine powers the fan which pressurizes ambient air to produce propulsion thrust in the fan air bypassing the core engine and discharged from the fan exhaust nozzle.

A portion of the fan air is channeled into the core engine wherein it is pressurized and mixed with fuel for generating hot combustion gases. Energy is extracted from the combustion gases in high and low pressure turbines which in turn power a compressor and the fan. The core exhaust gases are discharged from the core engine through a core exhaust nozzle and provide additional thrust for propelling the aircraft in flight.

In a typical short fan nacelle, the fan nozzle is spaced upstream from the core nozzle, and the fan exhaust is discharged separately from and surrounding the core exhaust. In a long nacelle, the fan nacelle extends aft of the core nozzle to provide a single common nozzle through which both the fan bypass air and core exhaust are discharged from the engine.

The fan nozzle and the core nozzle are typically fixed area nozzles, although they could be configured as variable area nozzles. Variable area nozzles permit adjustment of the aerodynamic performance of the engine which correspondingly increases complexity, weight, and cost of the engine.

Furthermore, turbofan aircraft engines typically include thrust reversers for use in providing braking thrust during landing of the aircraft. Various types of thrust reversers are found in the engine nacelle and further increase complexity, weight, and cost of the engine.

In U.S. Pat. No. 6,751,944 entitled "Confluent Variable Exhaust Nozzle," assigned to the present assignee, an improved variable area exhaust nozzle is disclosed for a turbofan aircraft engine. The confluent nozzle includes outer and inner conduits, with a plurality of flaps therebetween. The flaps may be selectively opened to bypass a portion of exhaust flow from the inner conduit through the outer conduit in confluent exhaust streams from concentric main and auxiliary exhaust outlets.

In this way, the auxiliary outlet may be operated during takeoff operation of the aircraft for temporarily increasing exhaust flow area for correspondingly reducing velocity of the exhaust flow. Noise may therefore be reduced during takeoff operation using a relatively simple and compact variable area configuration.

However, the auxiliary outlet itself is no longer utilized following takeoff operation, and may introduce base drag thereat during the remainder of the aircraft flight, including the typically long duration cruise operation.

Accordingly, it is desired to obtain the various benefits of using the confluent exhaust nozzle, while also reducing base drag attributable thereto during operation.

BRIEF SUMMARY OF THE INVENTION

A gas turbine engine exhaust nozzle includes a nacelle having an inlet and main outlet at opposite ends, and a main duct extending therebetween. A secondary bypass duct extends radially through the nacelle upstream of the main outlet and includes an unobstructed secondary inlet joined to the main duct, and a secondary outlet surrounding the main outlet for collectively discharging exhaust flow in confluent streams.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
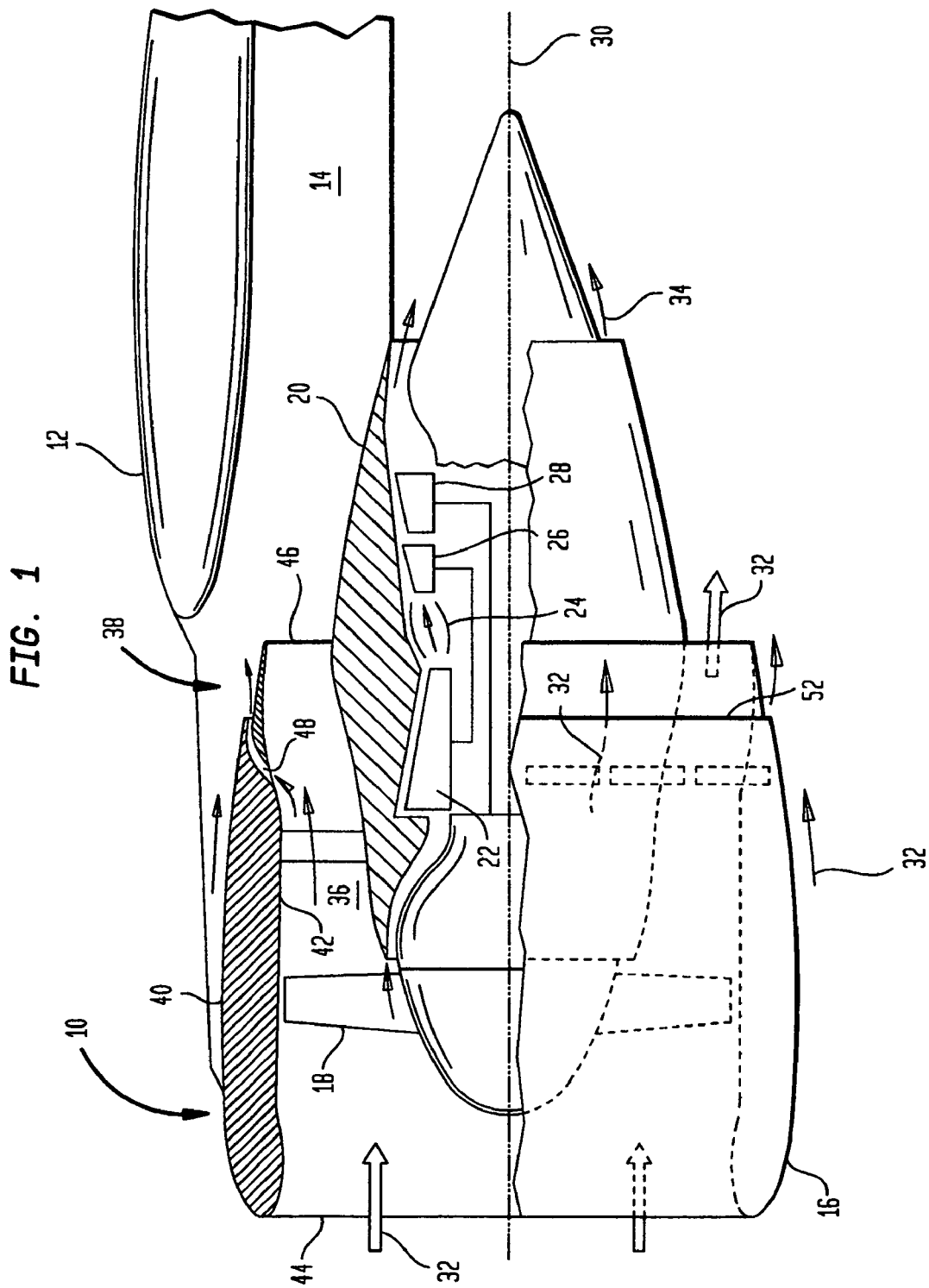
FIG. 1 is a partly sectional, axial view of an exemplary turbofan aircraft gas turbine engine including a fan exhaust nozzle.

Illustrated in FIG. 1 is a turbofan aircraft gas turbine engine 10 suitably mounted to the wing 12 of an aircraft by a supporting pylon 14. Alternatively, the engine could be mounted to the fuselage of the aircraft if desired.

The engine includes an annular fan nacelle 16 surrounding a fan 18 which is powered by a core engine surrounded by a core nacelle or cowl 20. The core engine includes in serial flow communication a multistage axial compressor 22, an annular combustor 24, a high pressure turbine 26, and a low pressure turbine 28 which are axisymmetrical about a longitudinal or axial centerline axis 30.

During operation, ambient air 32 enters the fan nacelle and flows past the fan blades into the compressor 22 for pressurization. The compressed air is mixed with fuel in the combustor 24 for generating hot combustion gases 34 which are discharged through the high and low pressure turbine 26,28 in turn. The turbines extract energy from the combustion gases and power the compressor 22 and fan 18, respectively.

A majority of air is pressurized by the driven fan 18 and bypasses the core engine through a substantially annular main bypass duct 36 which terminates in a fan exhaust nozzle 38 for producing a substantial portion of the propulsion thrust which powers the aircraft in flight. The combustion gases 34 are exhausted from the aft outlet of the core engine for providing additional thrust.

The fan nacelle includes radially outer and inner cowlings or skins 40,42 which extend axially from a leading edge of the nacelle defining an annular main inlet 44 to an opposite trailing edge defining an annular main outlet 46. The fan nacelle may have any conventional configuration, and is typically formed in two generally C-shaped halves which are pivotally joined to the supporting pylon 14 for being opened during maintenance operation.

The exemplary fan nacelle illustrated in FIG. 1 is a short nacelle terminating near the middle of the core engine for discharging the pressurized fan airflow separately from and surrounding the exhaust flow 34 discharged from the aft outlet of the core engine. In alternate embodiments, the fan nacelle could be long and extend downstream of the core engine for providing a single, common outlet for both the fan air and the core exhaust.

In the exemplary embodiment illustrated in FIG. 1, the core engine is mounted concentrically inside the fan nacelle by a row of supporting struts in a conventional manner. The core cowl 20 is spaced radially inwardly from the inner skin 42 of the fan nacelle to define the main bypass duct 36 therebetween which bypasses the major portion of the fan air around the core engine during operation. The fan bypass duct terminates in the annular, or partly annular fan nozzle 38 at the nacelle trailing edge or outlet 46.

The main outlet 46 of the fan nozzle 38 illustrated in FIG. 1 has a fixed area for all operating conditions from takeoff through cruise to landing. Particularly during takeoff, discharge of the fan air 32 from the main outlet 46 provides a substantial amount of takeoff thrust, with a corresponding amount of takeoff noise.

In order to reduce the takeoff noise, the fan nozzle 38 illustrated in FIG. 1 further includes a secondary bypass duct 48 extending radially through the fan nacelle 16 upstream or forward of the main outlet 46 for cooperating therewith. The secondary duct 48 operates full time for providing continuous discharge therethrough during all engine operating conditions, without any valves or flaps therein, and without variable area capability.

Figure 2:
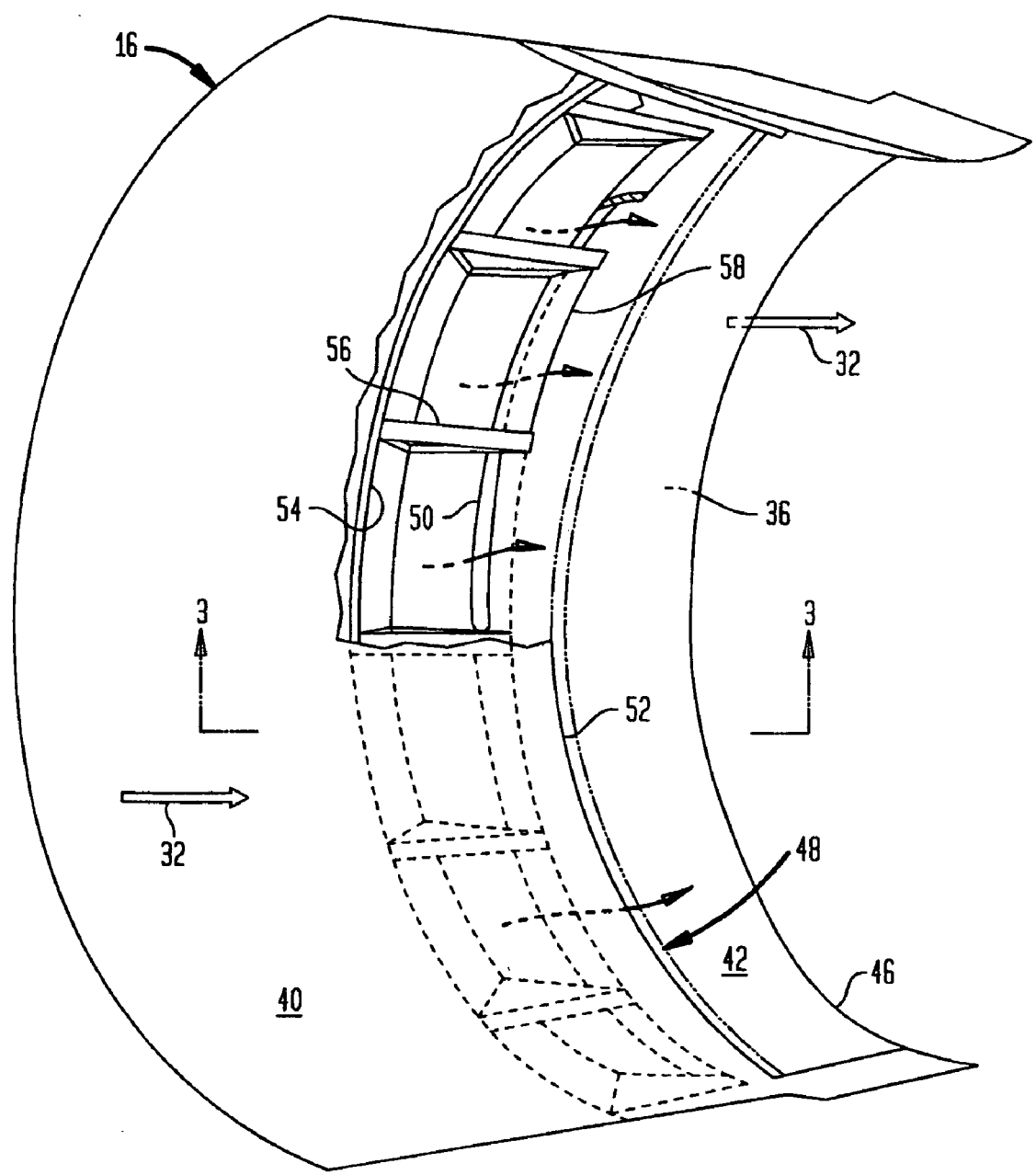
FIG. 2 is an isometric view of a portion of the fan nozzle illustrated in FIG. 1.
Figure 3:
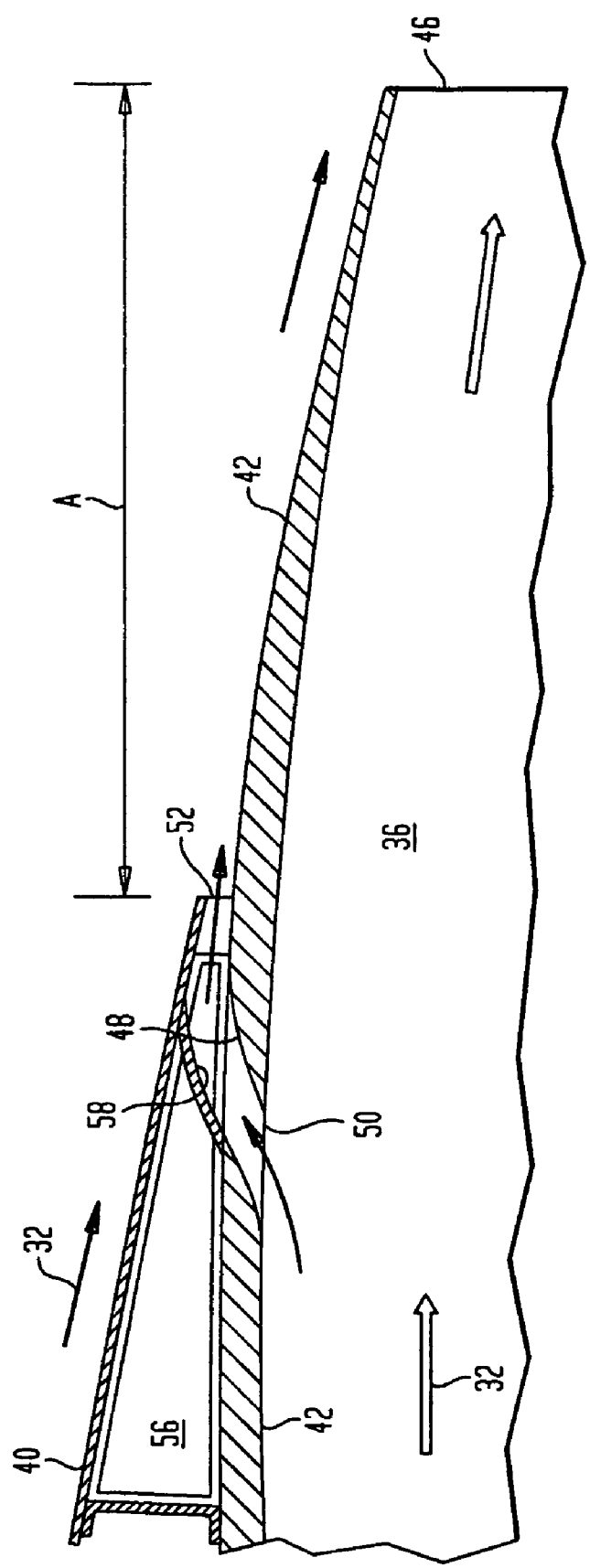
FIG. 3 is an axial sectional view through a portion of the fan nozzle illustrated in FIG. 2 and taken along line 3—3.

The secondary duct 48 is illustrated in more detail in FIGS. 2 and 3 and includes an unobstructed secondary inlet 50 disposed continuously in flow communication with the main bypass duct 36. The secondary duct also includes a secondary or auxiliary outlet 52 disposed upstream from and surrounding the main outlet 46. In this way, the main and secondary outlets 46,52 cooperate together for collectively discharging the fan exhaust flow 32 in confluent streams from the fan nozzle.

The radially outer and inner skins 40,42 of the fan nacelle provide relatively thin sheet metal surfaces for bounding the secondary duct 48 contained radially therebetween. The outer skin 40 terminates at the secondary outlet 52. And, the inner skin 42 extends aft from the secondary outlet 52 to terminate at the main outlet 46 downstream therefrom, thusly exposing the aft portion of the inner skin to the surrounding environment.

As shown in FIG. 3, the main and secondary outlets 46,52 are axially spaced apart from each other by the longitudinal distance A, and extend in parallel planes to provide complementary coplanar portions of the collective fan exhaust outlet. The outer surface of the inner skin 42 aft of the secondary outlet 52 preferably blends aerodynamically smoothly with the outer skin 40 extending upstream therefrom.

The overall profile and axial contour of the fan nacelle 16 illustrated in FIG. 1 may be determined in any conventional manner for maximizing aerodynamic performance of the nacelle, while minimizing aerodynamic drag therefrom. The fan nozzle is disposed at the aft end of the fan nacelle, and the outer and inner skins 40,42 preferably converge with decreasing diameter aft to the secondary and main outlets 52,46, respectively.

In this configuration, the ambient freestream air 32 flows aft over the fan nacelle during aircraft flight operation, with a thin boundary layer in which the velocity of the freestream air transitions from zero attached to the nacelle to the correspondingly high velocity associated with movement of the engine through the ambient air.

In a conventional, and axially continuous, fan nacelle having a main fan outlet, without the secondary outlet described above, the boundary layer of the ambient freestream increases and typically becomes unattached to the fan nacelle at its discharge end. Such thick boundary layers and flow detachment correspondingly effect an increase in aerodynamic drag, which correspondingly decreases the performance and efficiency of the engine during aircraft flight operation.

However, by introducing the secondary bypass duct 48 illustrated in FIG. 3, a portion of the pressurized fan bypass air 32 from the main duct 36 may be bled through the secondary outlet 52 to energize the boundary layer of the freestream ambient airflow over the external surface of the nacelle, as well as increase velocity of the local airflow aft of the secondary outlet 52.

The axial spacing A of the secondary outlet 52 from the main outlet 46 may be selected and optimized in conjunction with the total flow area of the secondary outlet 52 for reducing aerodynamic drag during operation. Bleeding the pressurized bypass air 32 through the secondary duct 48 energizes the freestream boundary layer to decrease its thickness and reduce or prevent flow separation therefrom as it flows over the nacelle to main outlet 46.

Furthermore, the pressurized bypass air channeled through the secondary bypass duct 48 increases the velocity of the ambient freestream air for in turn decreasing the differential velocity with the fan air discharged through the main outlet 46, which in turn decreases noise generated therefrom.

The secondary bypass duct 48 illustrated in FIGS. 2 and 3 may have various configurations for maximizing efficiency of bleeding of a small portion of the pressurized fan air from the main bypass duct 36 through the secondary bypass duct 48 and out the secondary outlet 52. For example, the secondary inlet 50 is in the preferred form of a row of circumferentially spaced apart secondary inlet apertures disposed radially through the inner skin 42 in flow communication with the main duct 36.

As best shown in FIG. 2, a radial frame 54 extends circumferentially between the outer and inner skins 40,42 forward of the row of inlet apertures 50. A plurality of longitudinal frames 56 extend axially aft from the radial frame 54, and are disposed circumferentially between corresponding ones of the secondary inlet apertures 50 segmenting the secondary duct 48 in this region.

The radial and longitudinal frames 54,56 increase the strength of the fan nacelle in the region of the secondary inlets 50, and the longitudinal frames 56 may be used to prevent crossflow between the secondary inlets as the bypass air flows axially aft through the secondary duct 48.

The main and secondary ducts 36,48 illustrated in FIG. 3 preferably converge in area aft toward the corresponding main and secondary outlets 46,52 thereof to provide concentric and confluent exhaust flow discharge therefrom. A typical fan nozzle converges to a throat of minimum flow area at the outlet end thereof, which throats may be collectively defined by the main and secondary outlets 46,52 in the embodiment illustrated in FIG. 3.

Since the secondary bypass duct 48 is at all times unobstructed during operation, the main and secondary outlets 46,52 are sized in flow area to collectively discharge the entire fan exhaust bypass flow from the fan 18 and main bypass duct 36 extending aft therefrom at the cruise design point of the engine. An aircraft engine is typically designed at a single design point for maximum performance and efficiency, which is typically the cruise condition at which the aircraft operates for a majority of time.

The pressurized fan air 32 discharged from the main duct 36 provides the majority of propulsion thrust during cruise operation, and for maximum performance and efficiency the area distributions of the main duct 36 and the secondary duct 48 are designed together, with the discharge flow area of the two outlets 46,52 also being designed together for collectively providing the required flow area for efficient operation at cruise.

In the configuration illustrated in FIG. 3, the discharge flow area of the main outlet 46 will be correspondingly smaller than the area thereof which would otherwise be required without the introduction of the secondary outlet 52. By introducing the additional discharge area with the secondary outlet 52, the discharge area of the main outlet 46 is correspondingly reduced for maintaining efficient performance of the engine at cruise.

Since the outer and inner skins are relatively thin sheet metal components, the secondary bypass duct 48 should be formed with suitable bounding surfaces for efficiently carrying the bypass flow therethrough. In the exemplary embodiment illustrated in FIGS. 2 and 3, a plurality of flow deflectors 58 are fixedly joined between the outer and inner skins 40,42 and between corresponding ones of the longitudinal frames 56. In FIG. 2, one of the deflectors has been removed to illustrate the secondary inlet aperture 50 therebelow, and another flow deflector has been removed in part for clarity of presentation.

The flow deflectors 58 may be formed of thin sheet metal and suitably fixedly joined in the available space provided between the converging outer and inner skins. The deflectors are preferably axially arcuate as illustrated in FIG. 3 and are located coextensively with the forward wall of the secondary inlet apertures 50 and with the inner surface of the outer skin 40 to provide an aerodynamically smooth contour axially therealong.

As shown in FIG. 2, the secondary apertures 50 are preferably elongate circumferentially between the longitudinal frames 56. And, each of the deflectors 58 is inclined rearwardly over a respective one of the apertures 50 for aerodynamically guiding and turning aft the exhaust flow toward the secondary outlet 52.

As shown in FIG. 3, the aft wall of the secondary inlet aperture 50 may be profiled or curved axially aft for providing a smooth inner boundary for the secondary bypass duct 48. The secondary duct is fixed in structure and area distribution, and is devoid of any movable flaps or doors which would otherwise provide variable area performance which is undesirable for the simple secondary duct 48 being introduced in the fan nacelle.

The longitudinal frames 56 illustrated in FIG. 3 are preferably imperforate and terminate short or forward of the secondary outlet 52. The secondary outlet 52 thusly forms an annulus extending circumferentially at least in part over a plurality of the longitudinal frames 56, deflectors 58, and apertures 50 as illustrated in FIG. 2 for commonly discharging the bleed exhaust flow therefrom. The fan nacelle illustrated in FIG. 2 is one of two nacelle halves in a typical configuration, and correspondingly the secondary outlet 52 provides two separate halves of the otherwise common annulus outlet.

In the exemplary embodiment illustrated in FIG. 1, the fan nacelle 16 is relatively short and terminates in an intermediate region of the core nacelle 20. The core nacelle is spaced radially inwardly from the aft portion of the inner skin 42 to define the fan bypass duct 36 as the main duct, with the surrounding nacelle defining the short fan nacelle 16. In this way, the confluent fan nozzle 38 provides the outlet for the fan bypass air, whereas the core engine itself has its own annular exhaust nozzle at the aft end thereof located downstream from the fan nozzle 38.

Figure 4:
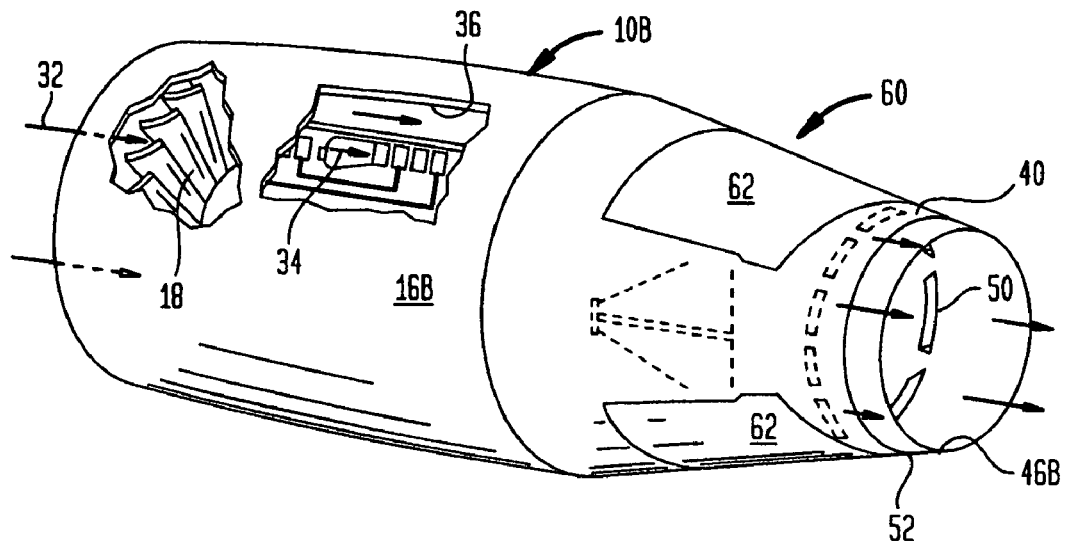
FIG. 4 is an isometric view of a long nacelle turbofan engine having a common exhaust nozzle at the aft end thereof.
Figure 5:
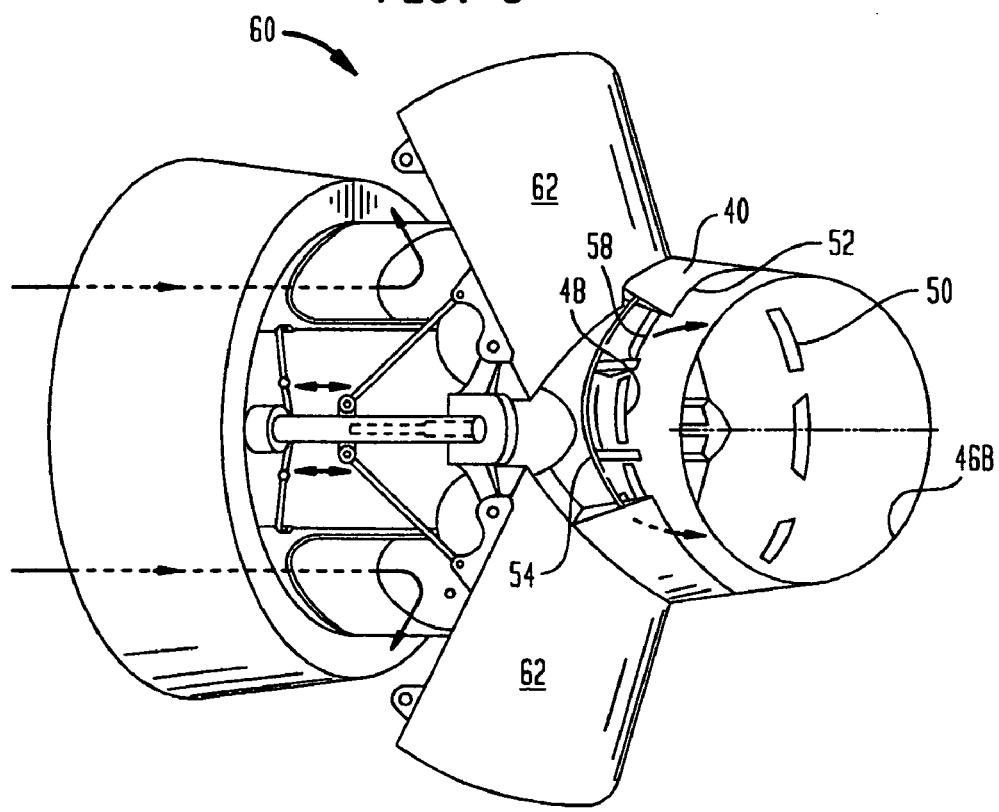
FIG. 5 is an isometric view of the common exhaust nozzle illustrated in FIG. 4 disposed downstream from a thrust reverser shown in deployed position.

FIGS. 4 and 5 illustrate an alternate embodiment of the turbofan engine, designated 10B, in which the fan nacelle, designated 16B, extends downstream past the core engine disposed therein, and the main outlet, designated 46B, defines a common outlet for both the combustion gas exhaust 34 discharged from the core engine and the fan bypass air exhaust 32 discharged from the surrounding fan bypass duct 36. The secondary bypass duct 48 is integrated around the common exhaust nozzle 46B at the aft end of the engine.

In this embodiment, a conventional thrust reverser 60 is disposed in the nacelle 16B upstream from the secondary bypass duct 48, and may have any conventional configuration including a pair of reverser doors 62 which may be deployed open and stowed closed when required.

In view of the simplicity of the secondary bypass duct 48 disclosed above, it may be incorporated in any form of exhaust nozzle in which confluent exhaust streams can provide advantage in reducing noise between the high velocity discharge exhaust flow and the lower velocity surrounding flow streams, while also reducing drag.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A gas turbine engine exhaust nozzle comprising:
   a nacelle having an inlet at a forward end, a main outlet at an axially opposite aft end, and a main duct extending therebetween; and
   a secondary bypass duct extending radially through said nacelle upstream of said main outlet, and having an unobstructed secondary inlet disposed continuously in flow communication with said main duct, and a secondary outlet surrounding said main outlet; and
   said main and secondary outlets being complementary in discharge flow area for collectively discharging in confluent streams the entire exhaust flow from said main duct.

2. A gas turbine engine exhaust nozzle comprising:
   a nacelle having an inlet at a forward end, a main outlet at an aft end, and a main duct extending therebetween;
   a secondary bypass duct extending radially through said nacelle upstream of said main outlet, and having an unobstructed secondary inlet disposed continuously in flow communication with said main duct, and a secondary outlet surrounding said main outlet for collectively discharging with said main outlet exhaust flow in confluent streams; and wherein said nacelle includes radially outer and inner skins bounding said secondary duct, with said outer skin terminating at said secondary outlet, and said inner skin extending aft therefrom to terminate at said main outlet.

3. A nozzle according to claim 2 wherein said main and secondary outlets are axially spaced apart in parallel planes.

4. A nozzle according to claim 3 wherein said secondary inlet comprises a row of circumferentially spaced apart inlet apertures disposed through said inner skin.

5. A nozzle according to claim 4 further comprising:
a radial frame extending circumferentially between said outer and inner skins forward of said apertures; and
a plurality of longitudinal frames extending axially from said radial frame and disposed circumferentially between corresponding ones of said apertures.

6. A nozzle according to claim 5 wherein said outer and inner skins converge aft to said secondary and main outlets, respectively.

7. A nozzle according to claim 6 wherein said main and secondary ducts converge aft toward said main and secondary outlets thereof to provide concentric and confluent exhaust flow discharge therefrom.

8. A nozzle according to claim 7 wherein said main and secondary outlets are sized in flow area to collectively discharge exhaust from a gas turbine engine at the cruise design point thereof.

9. A nozzle according to claim 7 wherein said secondary duct includes a plurality of flow deflectors fixedly joined between said outer and inner skins and between corresponding ones of said longitudinal frames.

10. A nozzle according to claim 9 wherein:
said apertures are elongate circumferentially between said longitudinal frames; and
each of said deflectors is inclined rearwardly over a respective one of said apertures for guiding said exhaust flow aft toward said secondary outlet.

11. A nozzle according to claim 10 wherein said longitudinal frames are imperforate and terminate short of said secondary outlet, and said secondary outlet forms an annulus extending circumferentially at least in part over a plurality of said longitudinal frames, deflectors, and apertures for commonly discharging said exhaust flow therefrom.

12. A nozzle according to claim 7 further comprising a core nacelle spaced radially inwardly from an aft portion of said inner skin to define a fan bypass duct as said main duct, and said surrounding nacelle defines a fan nacelle.

13. A nozzle according to claim 7 wherein said nacelle extends downstream past a core engine disposed therein, and said main outlet defines a common outlet for both combustion gas exhaust discharged from said core engine, and fan bypass air exhaust discharged from a surrounding fan bypass duct.

14. A nozzle according to claim 13 further comprising a thrust reverser disposed in said nacelle upstream from said secondary bypass duct.

15. An exhaust nozzle for a turbofan gas turbine engine comprising:
a nacelle having an inlet at a forward end, a main outlet at an axially opposite aft end, and a main duct extending therebetween;
a secondary bypass duct extending radially through said nacelle upstream of said main outlet, and having an unobstructed secondary inlet disposed continuously in flow communication with said main duct, and a secondary outlet surrounding said main outlet; and
said main and secondary outlets are sized in flow area to collectively discharge exhaust in only two corresponding confluent streams from said turbofan engine at the cruise design point thereof.

16. A nozzle according to claim 15 wherein said nacelle includes radially outer and inner skins bounding said secondary duct, with said outer skin terminating at said secondary outlet, and said inner skin extending aft therefrom to terminate at said main outlet.

17. A nozzle according to claim 16 wherein said main and secondary outlets are axially spaced apart in parallel planes.

18. A nozzle according to claim 16 wherein said outer and inner skins converge aft to said secondary and main outlets, respectively.

19. A nozzle according to claim 16 wherein said main and secondary ducts converge aft toward said main and secondary outlets thereof to provide concentric and confluent exhaust flow discharge therefrom.

20. A nozzle according to claim 16 wherein said secondary inlet comprises a row of circumferentially spaced apart inlet apertures disposed through said inner skin.

21. A nozzle according to claim 20 further comprising:
a radial frame extending circumferentially between said outer and inner skins forward of said apertures; and
a plurality of longitudinal frames extending axially from said radial frame and disposed circumferentially between corresponding ones of said apertures.

22. A nozzle according to claim 21 wherein said secondary duct includes a plurality of flow deflectors fixedly joined between said outer and inner skins and between corresponding ones of said longitudinal frames.

23. A nozzle according to claim 22 wherein:
said apertures are elongate circumferentially between said longitudinal frames; and
each of said deflectors is inclined rearwardly over a respective one of said apertures for guiding said exhaust flow aft toward said secondary outlet.

24. A nozzle according to claim 23 wherein said longitudinal frames are imperforate and terminate short of said secondary outlet, and said secondary outlet forms an annulus extending circumferentially at least in part over a plurality of said longitudinal frames, deflectors, and apertures for commonly discharging said exhaust flow therefrom.

25. A nozzle according to claim 24 further comprising a core nacelle spaced radially inwardly from an aft portion of said inner skin to define a fan bypass duct as said main duct, and said surrounding nacelle defines a fan nacelle.

* * * * *